(12) United States Patent
Shimura et al.

(10) Patent No.: US 10,178,296 B2
(45) Date of Patent: Jan. 8, 2019

(54) IMAGING APPARATUS, CONTROL METHOD OF IMAGING APPARATUS, IMAGING SYSTEM, AND PORTABLE DISPLAY DEVICE

(71) Applicant: Olympus Corporation, Hachioji-shi, Tokyo (JP)

(72) Inventors: Kazuhiko Shimura, Hachioji (JP); Yoshiyuki Fukuya, Sagamihara (JP); Kazuo Kanda, Higashiyamato (JP); Keito Fukushima, Mitaka (JP); Yoshihisa Ogata, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 57 days.

(21) Appl. No.: 15/178,749

(22) Filed: Jun. 10, 2016

(65) Prior Publication Data

US 2017/0070658 A1   Mar. 9, 2017

(30) Foreign Application Priority Data

Sep. 9, 2015   (JP) ................................. 2015-177705

(51) Int. Cl.
*H04N 5/232* (2006.01)
*G02B 27/01* (2006.01)

(52) U.S. Cl.
CPC ....... *H04N 5/23206* (2013.01); *G02B 27/017* (2013.01); *H04N 5/23216* (2013.01); *H04N 5/23293* (2013.01); *G02B 2027/014* (2013.01); *G02B 2027/0138* (2013.01)

(58) Field of Classification Search
CPC .......... H04N 5/23206; H04N 5/23216; H04N 5/23293; G02B 27/017; G02B 2027/014; G02B 2027/0138
See application file for complete search history.

(56) References Cited

U.S. PATENT DOCUMENTS

| 6,809,759 | B1* | 10/2004 | Chiang | H04N 5/23293 348/211.2 |
| 8,902,320 | B2* | 12/2014 | Jung | H04N 1/00132 348/207.1 |
| 9,692,978 | B2* | 6/2017 | Hada | H04N 5/23293 |
| 9,930,193 | B2* | 3/2018 | Fujita | H04N 1/00206 |
| 9,930,240 | B2* | 3/2018 | Song | H04N 1/00209 |
| 2007/0094490 | A1* | 4/2007 | Lohr | H04L 67/14 713/153 |

(Continued)

FOREIGN PATENT DOCUMENTS

JP   4702211   6/2011

*Primary Examiner* — Timothy J Henn
(74) *Attorney, Agent, or Firm* — John C. Pokotylo; Pokotylo Patent Services

(57) ABSTRACT

According to the present invention, an imaging apparatus includes: an imaging unit which images a subject to acquire a subject image; a communication unit configured to wirelessly communicate with devices; an output unit configured to output the subject image to the device previously set as an output destination among the devices; a recognition unit which recognizes that one of the devices has been operated by a user; and an output control unit which changes the output destination of the subject image by the output unit when the recognition unit recognizes that one of the devices has been operated by the user.

12 Claims, 5 Drawing Sheets

(56) References Cited

U.S. PATENT DOCUMENTS

| | | | | |
|---|---|---|---|---|
| 2007/0291694 A1* | 12/2007 | Zhang | .................... | H04L 67/14 |
| | | | | 370/331 |
| 2008/0238893 A1* | 10/2008 | Ishii | .................... | H04N 5/2251 |
| | | | | 345/204 |
| 2010/0255784 A1* | 10/2010 | Ido | .................... | H04N 1/00244 |
| | | | | 455/41.2 |
| 2011/0242317 A1* | 10/2011 | Wengrovitz | ........... | H04N 7/181 |
| | | | | 348/143 |
| 2011/0310285 A1* | 12/2011 | Nakai | .................. | H04N 5/2354 |
| | | | | 348/333.06 |
| 2012/0083313 A1* | 4/2012 | Marcus | .................. | G03B 17/38 |
| | | | | 455/556.1 |
| 2012/0293702 A1* | 11/2012 | Siulinski | .............. | G02B 27/017 |
| | | | | 348/333.09 |
| 2013/0083228 A1* | 4/2013 | Iwatani | .............. | H04N 5/23216 |
| | | | | 348/333.01 |
| 2014/0156854 A1* | 6/2014 | Gaetano, Jr. | ........ | H04L 65/1069 |
| | | | | 709/227 |
| 2014/0375830 A1* | 12/2014 | Ishii | .................. | H04N 5/23206 |
| | | | | 348/211.2 |
| 2015/0092008 A1* | 4/2015 | Manley | ................ | H04L 65/403 |
| | | | | 348/14.07 |
| 2015/0094024 A1* | 4/2015 | Abiri | .................... | H04W 12/06 |
| | | | | 455/411 |
| 2015/0378331 A1* | 12/2015 | Hayashi | ............. | H04L 12/6418 |
| | | | | 700/19 |
| 2017/0061931 A1* | 3/2017 | Frieder | .................. | H04W 4/21 |
| 2017/0223579 A1* | 8/2017 | Lee | ...................... | H04W 76/18 |

* cited by examiner

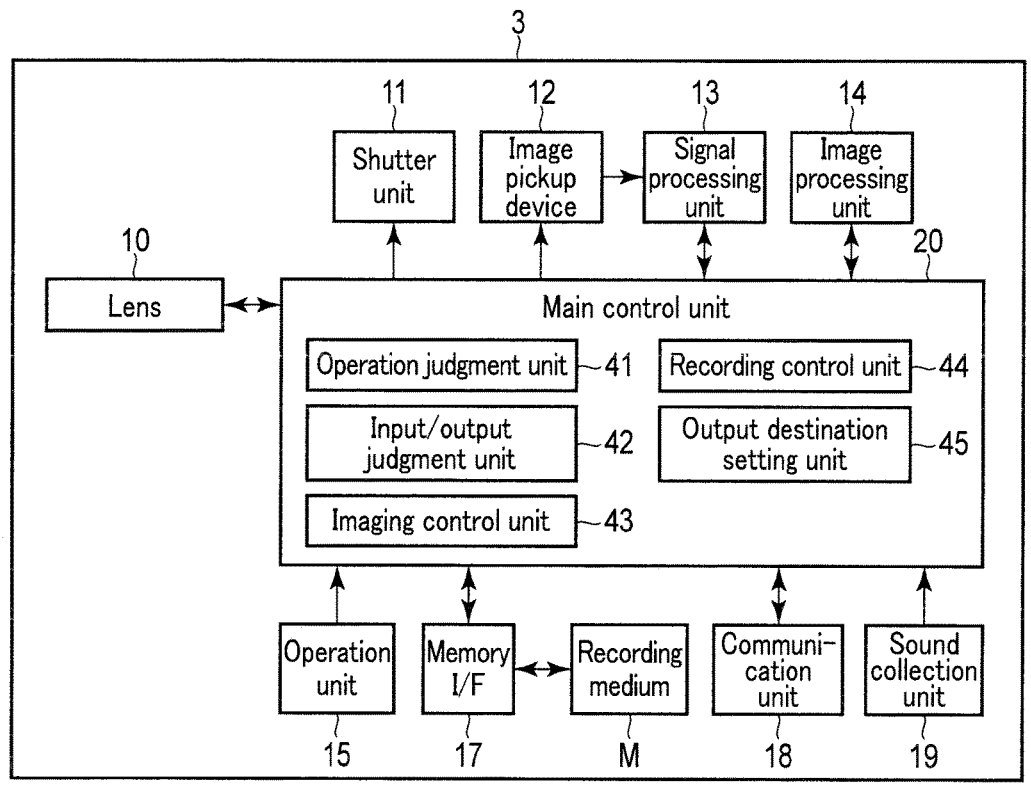
F I G. 2
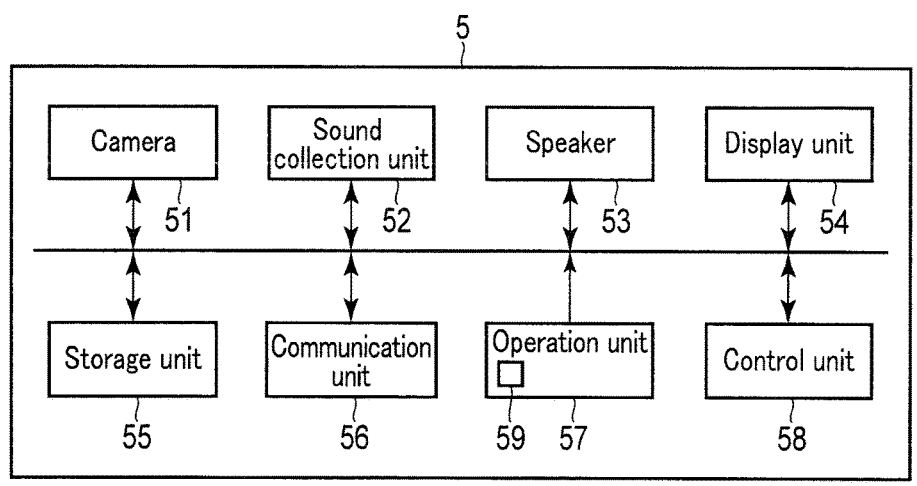
F I G. 3

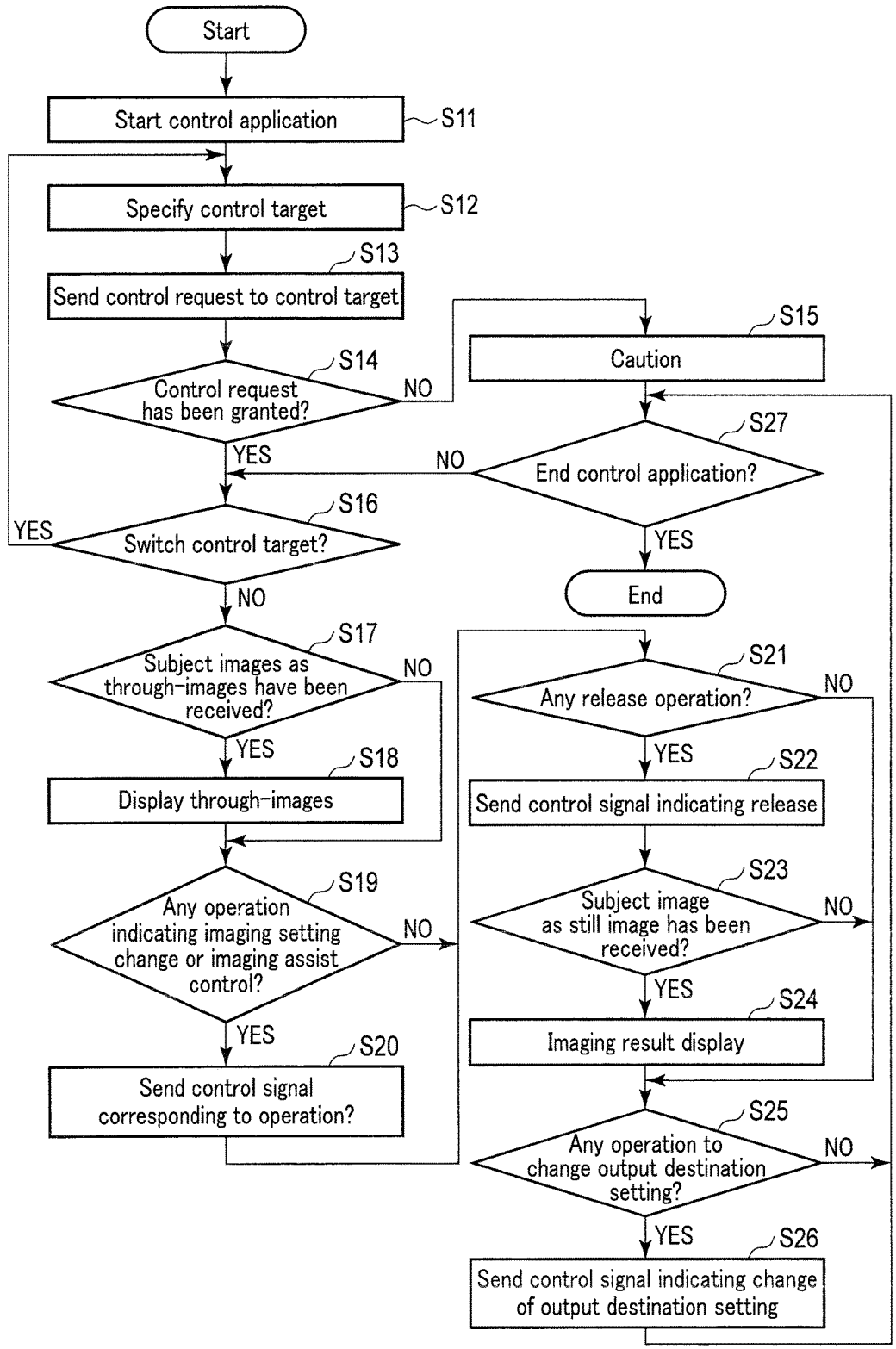
F I G. 4

IMAGING APPARATUS, CONTROL METHOD OF IMAGING APPARATUS, IMAGING SYSTEM, AND PORTABLE DISPLAY DEVICE

CROSS-REFERENCE TO RELATED APPLICATIONS

This application is based upon and claims the benefit of priority from the prior Japanese Patent Application No. 2015-177705, filed Sep. 9, 2015, the entire contents of which are incorporated herein by reference.

BACKGROUND OF THE INVENTION

1. Field of the Invention

The present invention relates to an imaging apparatus, a control method of the imaging apparatus, an imaging system, and a portable display device.

2. Description of the Related Art

There has been a widely used imaging apparatus which is configured to be able to wirelessly communicate with an electronic device such as a smartphone or a tablet type PC comprising a display unit and an operation unit and which operates under the control of the electronic device. The imaging apparatus is configured as, for example, a lens-type camera having no display unit. This imaging apparatus performs such actions as receiving a control signal sent from the electronic device by wireless communication, changing the setting for imaging in accordance with the received control signal, and imaging a subject figure. The imaging apparatus can also output a subject image obtained by imaging the subject figure to the electronic device by wireless communication, and thereby display the subject image on the electronic device.

Another expected usage of the imaging apparatus described above is, for example, to continuously display subject images on an electronic device (a wearable display unit, a wearable display device or instrument) mainly intended for display such as head mount display (HMD) or face-mounted display (FMD) to perform through-image display. For example, Japanese Patent No. 4702211 describes a configuration which continuously displays subject images on an electronic device mainly intended for display to perform through-image display.

BRIEF SUMMARY OF THE INVENTION

However, in order that the electronic device mainly intended for display is designed to prioritize wearability and handsfreeness which does not give a user inconvenient restrictions, compatible with operability may be difficult.

The present invention is intended to provide an imaging apparatus, a control method of the imaging apparatus, an imaging system, and a portable display device having higher convenience.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram illustrating a configuration example of an imaging apparatus according to one embodiment;

FIG. 3 is a diagram illustrating a configuration example of an electronic device according to one embodiment;

FIG. 4 is a diagram illustrating an example of the operation of the electronic device according to one embodiment;

DETAILED DESCRIPTION OF THE INVENTION

Hereinafter, an imaging apparatus, a control method of the imaging apparatus, an imaging system, and a portable display device according to one embodiment will be described in detail with reference to the drawings.

Figure 1:
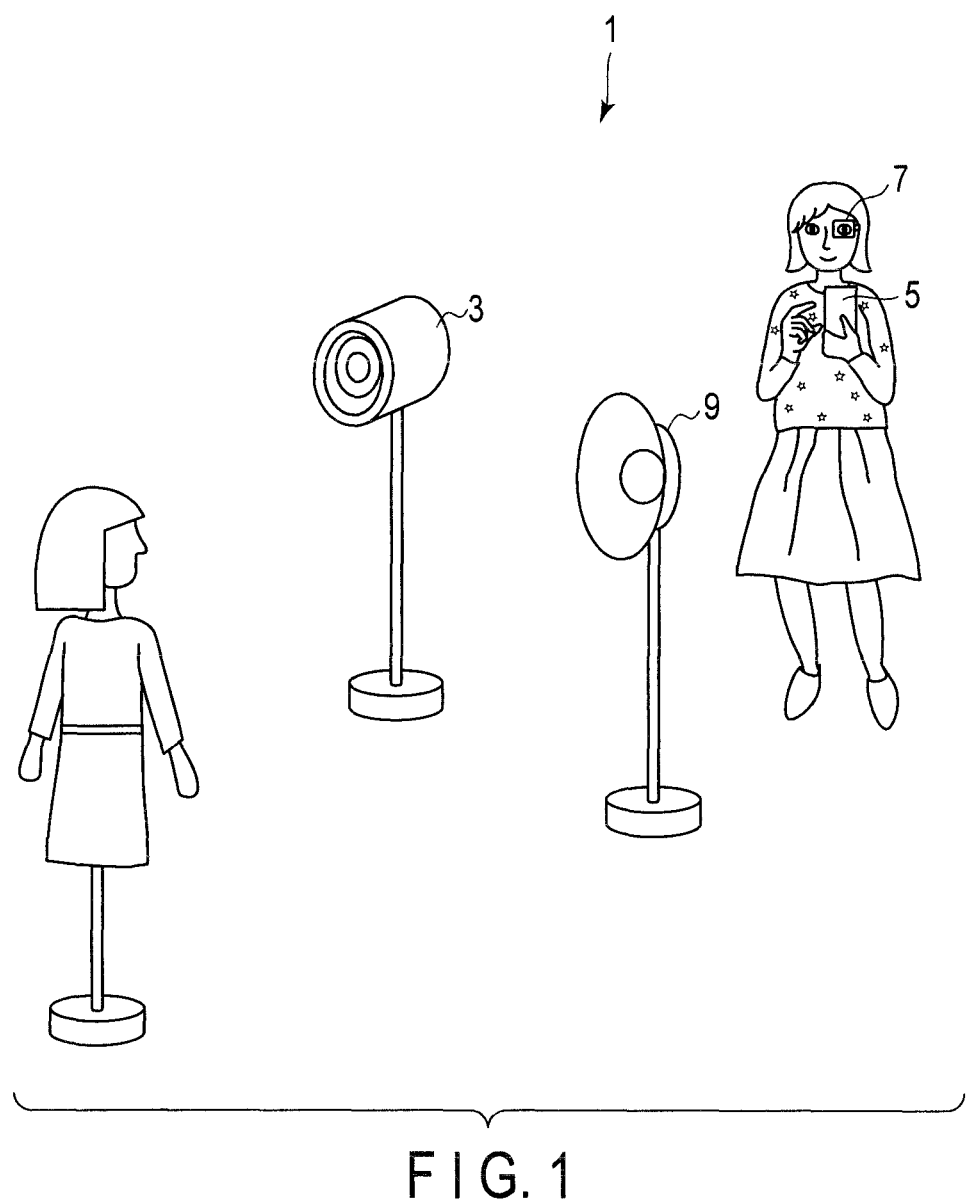
FIG. 1 is a diagram illustrating an example of an imaging system according to one embodiment.

FIG. 1 is an explanatory diagram showing an example of an imaging system 1. The imaging system 1 comprises, for example, an imaging apparatus 3, a smartphone 5, a head mount display (HMD) 7, and a light emitting device 9. The smartphone 5 may naturally be a tablet PC or some other portable terminal, and a watch-type terminal, for example, has been used in recent years. These devices can be called a portable display unit or a portable display instrument or device in view of its display function, and is grasped or carried at hand and is therefore designed to allow easy manual operation of switches or a touch panel. These devices are held with hand and allow sound to be easily collected by a directive microphone, and are also suited to, for example, voice input operation.

The imaging apparatus 3 is a camera which acquires a subject image by imaging a subject figure. The imaging apparatus 3 can wirelessly communicate with, for example, the smartphone 5 or the HMD (wearable display unit) 7. For example, the imaging apparatus 3, the smartphone 5, and the HMD 7 are compliant with a wireless LAN or Bluetooth (registered trademark). The imaging apparatus 3 wirelessly communicates with the smartphone 5 or the HMD 7 by use of the wireless LAN or Bluetooth.

The imaging apparatus 3 receives a control signal sent from the smartphone 5 by wireless communication, and performs such operations as changing the setting for imaging in accordance with the received control signal and imaging a subject figure.

The imaging apparatus 3 can also output a subject image obtained by imaging the subject figure to the smartphone 5 or the HMD 7 by wireless communication, and thereby display the subject image on the smartphone 5 or the HMD 7. That is, the imaging apparatus 3 can perform imaging result display to display the subject image as an imaging result on the smartphone 5 or the HMD 7 by outputting the subject image to the smartphone 5 or the HMD 7 by wireless communication. For example, the imaging apparatus 3 can also sequentially output subject images obtained by imaging the subject figure at a predetermined period to the smartphone 5 or the HMD 7 by wireless communication, and thereby perform through-image display to continuously display the subject images on the smartphone 5 or the HMD 7.

The imaging apparatus 3 outputs the subject image to an electronic device set as an output destination among electronic devices that can communicate with the imaging apparatus 3. Further, when there is an electronic device which has been operated by a user among the electronic devices that can communicate with the imaging apparatus 3, the imaging apparatus 3 changes the output destination of the subject image. For example, when there is an electronic device which has been operated by the user among the electronic devices that can communicate with the imaging apparatus 3, the imaging apparatus 3 changes the output destination of the subject image to the electronic device which has been operated by the user. Thus, the imaging apparatus 3 can display the subject image on the electronic device being operated by the user.

The smartphone 5 is an electronic device comprising a display panel which displays images, and an operation unit which receives an operational input by the user. The smartphone 5 generates a control signal for controlling the operation of the imaging apparatus 3 on the basis of the operational input on the operation unit by the user. The smartphone 5 can control the operation of the imaging apparatus 3 by sending the generated control signal to the imaging apparatus 3 by wireless communication. The smartphone 5 receives the subject image output from the imaging apparatus 3 by wireless communication, and displays the received subject image on the display panel.

The HMD 7 is an electronic device comprising a display panel which displays images. The HMD 7 is, for example, attached to the head of the user so that the user can visually recognize the display panel. The HMD 7 receives the subject image output from the imaging apparatus 3 by wireless communication, and displays the received subject image on the display panel.

The light emitting device 9 is a device comprising a light emitting unit which emits light. The light emitting device 9 applies light to a subject by emitting the light. The light emitting device 9 wirelessly communicates with, for example, the imaging apparatus 3, and causes light emitting unit to emit light by the timing based on the control of the imaging apparatus 3.

FIG. 2 is a block diagram illustrating an example of the configuration of the imaging apparatus 3.

As shown in FIG. 2, the imaging apparatus 3 comprises a lens 10, a shutter unit 11, an image pickup device 12, a signal processing unit 13, an image processing unit 14, an operation unit 15, a memory I/F 17, a communication unit 18, a sound collection unit 19, and a main control unit 20.

The lens 10 forms transmitted light into an image on the image pickup device 12. The lens 10 comprises an imaging lens which is a combination of lenses, a diaphragm mechanism, a lens control unit which controls the operations of the imaging lens and the diaphragm mechanism, and an operational component. The imaging lens forms light rays from the subject into an image on an imaging surface of the image pickup device 12. The imaging lens may be configured so that its focal distance can be changed. The diaphragm mechanism is configured to be openable and closable, and adjusts the amount of the light rays entering the image pickup device via the imaging lens under the control of the lens control unit. The lens control unit is configured to be able to communicate with the main control unit 20. The lens control unit controls each of the operations of the imaging lens and the diaphragm mechanism in accordance with an input from the main control unit 20 or the operation of the operational component.

The shutter unit 11 is a mechanism which adjusts the amount of light entering the image pickup device 12 through the lens 10. The shutter unit 11 is, for example, a focal plane shutter.

The image pickup device 12 is provided in the rear part of the lens 10, that is, inside the housing of the imaging apparatus 3. The image pickup device 12 comprises the imaging surface in which imaging pixels for photoelectrically converting light to store a charge are arrayed. A color filter is provided on the surface of each of the imaging pixels which light enters. The image pickup device 12 comprises, for example, a charge coupled device (CCD) image sensor, a complementary metal oxide semiconductor (COMS) image sensor, or some other image pickup device. The image pickup device 12 generates a luminance signal by converting, into an electric signal corresponding to the light amount, the subject image which has been collected via the lens 10 and then formed into an image on the imaging surface. The imaging surface of the image pickup device is configured by, for example, a two-dimensional array of imaging pixels. Although the two-dimensional form is described, this represents pixels arranged on a plane, and is not a concept that excludes, for example, an image pickup device which has sensitivity in a depth direction or an image pickup device having a random pixel arrangement. The imaging surface of the image pickup device may be curved.

The signal processing unit 13 subjects the luminance signal generated by the image pickup device 12 to various signal processing under the control of the main control unit 20, and converts the luminance signal which has been subjected to the signal processing into a subject image of a digital signal. The signal processing unit 13 inputs the subject image to the main control unit 20.

As described above, the lens 10, the image pickup device 12, and the signal processing unit 13 constitute an imaging unit.

The imaging unit acquires the subject image when the image pickup device 12 images the light formed into an image on the imaging surface by the lens 10. The imaging unit also continuously acquires subject images to be displayed as through-images. For example, the imaging unit can acquire successive subject images that can be displayed as through-images by using the signal processing unit 13 to read the luminance signal generated by the image pickup device 12 at a period based on the control of the main control unit 20.

The image processing unit 14 subjects the subject images to various signal processing such as a color correction, a gamma (γ) correction, a contrast correction, monochrome/color mode processing, and through-image processing under the control of the main control unit 20. Further, the image processing unit 14 compresses the subject images in a jpeg format under the control of the main control unit 20 to convert the subject images into jpeg data which is image data in a jpeg format. The image processing unit 14 inputs the jpeg data to the main control unit 20.

The operation unit 15 comprises operational components for the user to perform various operations of the imaging apparatus 3. The operation unit 15 generates operation signals on the basis of the operation of the operational components by the user, and supplies the generated operation signals to the main control unit 20. The operational components include, for example, a release button and an electric power supply button. The release button is an operational component for the user to instruct the imaging apparatus 3 to perform imaging and imaging assist control. The operation unit 15 issues to the main control unit 20 an instruction (imaging assist instruction) as an operation signal to perform imaging assist control such as automatic exposure (AE) processing and automatic focus (AF) processing when the release button is pressed halfway. The operation unit 15 issues to the main control unit 20 an instruction (release instruction) as an operation signal to perform imaging when the release button is fully pressed.

The memory I/F 17 comprises a card slot into which a recording medium M comprising contact terminals can be inserted, and contact terminals which are electrically connected to the contact terminals of the recording medium M when the recording medium M is inserted in the card slot. The recording medium M is, for example, a memory card. The memory I/F 17 relays the input and output of data between the recording medium M and the main control unit 20.

The communication unit 18 is a circuit for performing a wireless communication with other electronic devices. The communication unit 18 is configured to be able to communicate with the smartphone 5 and the HMD 7. The communication unit 18 receives a control signal from an electronic device such as the smartphone 5 and the HMD 7, and supplies the received control signal to the main control unit 20. The communication unit 18 also receives, from the main control unit 20, data to be sent to an electronic device such as the smartphone 5 and the HMD 7, and sends the received data to an electronic device such as the smartphone 5 and the HMD 7.

The communication unit 18 can perform a communication by either a one-way communication which permits the same data to be simultaneously sent to multiple electronic devices, or a two-way communication which permits data to be sent to and received from one electronic device.

In the one-way communication, the communication unit 18 sends data without checking whether the sent data has been normally received by multiple electronic devices. Even when the communication unit 18 can not normally receive the data sent from one of the electronic devices, the communication unit 18 processes the next data sent from the electronic device without sending a request for resending to the electronic devices.

In the two-way communication, the communication unit 18 sends and receives data while checking together with the electronic device whether the data sent and received between the communication unit 18 and the electronic device have been normally received. According to this configuration, the communication unit 18 resends data to the electronic device when receiving a response saying that the data can not be normally received from the electronic device. Moreover, the communication unit 18 sends a request for resending to the electronic device when the data sent from the electronic device can not be normally received.

For example, the communication unit 18 assumes a communication method such as the wireless LAN or Bluetooth, and suitably uses one or both of these communication methods to perform a wireless communication with the smartphone 5 or the HMD 7. Specifically, the communication unit 18 functions as an access point (AP) of the wireless LAN to permit the communication between the smartphone 5 and the HMD 7 by the wireless LAN.

The communication unit 18 also permits a communication by Bluetooth by respectively pairing with the smartphone 5 and the HMD 7. These communication methods may be suitably changed, so that the wireless LAN may be used for an image communication while Bluetooth may be used for a communication such as a command communication of a control system. This enables communications for a communication switch instruction and for communication setting.

The sound collection unit 19 collects sound. For example, the sound collection unit 19 is a stereo microphone. The sound collection unit 19 converts sound into an analog electric signal, and converts the electric signal into a digital signal, thereby acquiring digital audio data. The sound collection unit 19 inputs the acquired audio data to the main control unit 20.

The main control unit 20 controls the operation of each unit of the imaging apparatus 3. The main control unit 20 comprises, for example, a CPU and a memory. The main control unit 20 enables various functions when the CPU reads and executes programs and data for control stored in the memory. The main control unit 20 functions as an operation judgment unit 41, an input/output judgment unit 42, an imaging control unit 43, a recording control unit 44, or an output destination setting unit 45.

The main control unit 20 stores output destination setting indicating an electronic device to which the subject image is output, for example, in the aforementioned memory or in the recording medium M attached to the memory I/F 17. The output destination setting includes, for example, information for specifying the electronic device to which the subject image is output. The main control unit 20 uses the communication unit 18 to send (output) the subject image acquired by the imaging unit to the electronic device indicated by the output destination setting. That is, the main control unit 20 functions as an output unit which can output subject images as through-images or still images to the electronic device set as an output destination in the output destination setting.

The operation judgment unit 41 judges the operation signal supplied from the operation unit 15. That is, the operation judgment unit 41 recognizes which operation has been indicated by the operation unit 15.

The input/output judgment unit 42 judges the control signal supplied from the communication unit 18. That is, the input/output judgment unit 42 analyzes the control signal supplied from the communication unit 18 to recognize which operation has been requested from the electronic device which is a communication partner. The control signal is, for example, an instruction to change imaging setting, an instruction to perform imaging assist control, an instruction to perform an imaging action, an instruction to change the output destination setting, or an instruction to request the imaging apparatus 3 for some other operation. That is, the input/output judgment unit 42 functions as a recognition unit which recognizes the operation in the electronic device.

The imaging control unit 43 performs various actions on the basis of the control signal analyzed by the input/output judgment unit 42. For example, the imaging control unit 43 changes the imaging setting which is setting for taking the subject image on the basis of a control signal indicating an instruction to change the imaging setting. The imaging setting is setting regarding an imaging action by the imaging unit, signal processing by the signal processing unit, and image processing by the image processing unit. Specifically, the imaging setting is, for example, an aperture value (F value), a shutter speed (SS), ISO sensitivity, an exposure value (Ev value), color tone, white balance (WB), an AF mode, recording image quality, an aspect ratio, a high dynamic range (HDR), and a photometry mode.

For example, the imaging control unit 43 performs the imaging assist control on the basis of a control signal indicating an instruction to perform the imaging assist control or a release instruction from the operation unit 15. As described above, the imaging assist control is the control of, for example, AF processing and AE processing.

For example, the imaging control unit 43 controls the imaging unit to perform an imaging action to acquire a subject image as a still image by the imaging unit on the basis of a control signal indicating an instruction to perform the imaging action or a release instruction from the operation unit 15. That is, when receiving the control signal indicating the instruction to perform the imaging action or the release instruction from the operation unit 15, the imaging control unit 43 actuates the imaging lens and the diaphragm mechanism by inputting a control signal corresponding to imaging setting to the lens control unit of the lens 10. Moreover, the imaging control unit 43 drives the shutter unit 11 to control the imaging unit so that the imaging unit acquires a subject image.

The imaging control unit 43 also controls the acquisition of subject images that can be displayed as through-images by the imaging unit. For example, the imaging control unit 43 controls the signal processing unit 13 to read the luminance signal generated by the image pickup device 12 at a preset period. Thus, the imaging control unit 43 causes the imaging unit to acquire successive subject images that can be displayed as through-images.

The recording control unit 44 comprises an intermediate buffer which temporarily records images. The recording control unit 44 sequentially records, in the intermediate buffer, the subject images acquired by the imaging action. The recording control unit 44 forms the subject images recorded in the intermediate buffer into a file, and write the file into the recording medium M attached to the memory I/F 17.

The output destination setting unit 45 performs processing to change the output destination setting. The output destination setting unit 45 changes the output destination setting on the basis of a control signal indicating an instruction to change the output destination setting. For example, the control signal indicating the instruction to change the output destination setting has information for specifying this electronic device. In this case, the output destination setting unit 45 sets the electronic device specified by the information for specifying this electronic device as an electronic device to which the subject image is output.

The output destination setting unit 45 generates a temporary output destination indicating an electronic device to which the subject image is temporarily output in accordance with the state of the imaging apparatus 3, and writes the generated temporary output destination into output destination setting. For example, when recognizing that one of the electronic devices that can communicate with is operated by the user, the output destination setting unit 45 writes the temporary output destination into the output destination setting. More specifically, when receiving a control signal indicating an instruction to change the imaging setting from the electronic device that can communicate with or an instruction to perform the imaging assist control, the output destination setting unit 45 recognizes that the above electronic device is operated by the user, and writes, into the output destination setting, the temporary output destination indicating the electronic device which has received control signal.

The output destination setting unit 45 may have any configuration to recognize that the electronic device is operated by the user. For example, the output destination setting unit 45 may be configured to recognize that the electronic device is operated by the user when the output destination setting unit 45 receives, from the electronic device, information indicating that the electronic device is operated by the user. For example, the output destination setting unit 45 may also be configured to recognize that the electronic device is operated by the user by regularly monitoring the state of the electronic device.

Furthermore, the output destination setting unit 45 returns the output destination setting to the original output destination from the temporary output destination when a preset condition is satisfied. For example, when writing the temporary output destination into the output destination setting, the output destination setting unit 45 writes the temporary output destination into the output destination setting after evacuating the setting of the original output destination to some other storage area. When the preset condition is satisfied, the output destination setting unit 45 returns the output destination setting to the original output destination from the temporary output destination by writing the evacuated setting of the original output destination into the output destination setting.

The condition that the output destination setting unit 45 returns the output destination setting to the setting of the original output destination from the temporary output destination may be any condition. For example, the output destination setting unit 45 may judge that the condition is satisfied when a preset given time has elapsed since the electronic device was no longer operated by the user. The output destination setting unit 45 may also be configured to judge that the condition is satisfied when a preset control signal is input from the electronic device. That is, the output destination setting unit 45 functions as an output control unit which changes the output destination of the subject image when a predetermined condition is satisfied.

FIG. 3 shows an example of the configuration of the smartphone 5. The smartphone 5 comprises a camera 51, a sound collection unit 52, a speaker 53, a display unit 54, a storage unit 55, a communication unit 56, an operation unit 57, and a control unit 58. The smartphone 5 further comprises a touch sensor 59.

The camera 51 is a camera provided in the smartphone 5. The camera 51 comprises an image pickup device which converts light into an electric signal, and a lens which forms light from a subject on the image pickup device as a subject figure. The camera 51 converts the light received by an optical system into an electric signal into an electric signal by the image pickup device under the control of the control unit 58, and generates image data.

The sound collection unit 52 collects sound. For example, the sound collection unit 52 is a stereo microphone. The sound collection unit 52 converts sound into an analog electric signal, and converts the electric signal into a digital signal, thereby acquiring digital audio data. The sound collection unit 52 inputs the acquired audio data to the control unit 58.

The speaker 53 reproduces the sound on the basis of an audio signal supplied from the control unit 58.

The display unit 54 displays a screen on the basis of an image input from the control unit 58. The display unit 54 comprises a display panel, and a drive circuit which drives the display panel to display the image. The display panel is, for example, a liquid crystal display, an organic EL display, or a display device for displaying other screens. The display unit 54 displays the screen on the display panel on the basis of an image input from the control unit 58.

The storage unit 55 comprises a storage device which stores various information. The storage device is, for example, a hard disk drive (HDD) or a solid state drive (SSD).

The storage unit 55 stores programs and applications which are executed by the control unit 58, and various data for control. The storage unit 55 may also be configured as a memory I/F such as a card slot into which the recording medium M comprising the contact terminals can be inserted.

The communication unit 56 is a circuit for wirelessly communicating with the imaging apparatus 3 and other electronic devices. The communication unit 56 is configured to be able to communicate with the imaging apparatus 3. The communication unit 56 receives the subject image from the imaging apparatus, and supplies the received subject image to the control unit 58. The communication unit 56 sends a control signal for controlling the imaging apparatus 3 to the imaging apparatus.

For example, the communication unit 56 wirelessly communicates with the imaging apparatus 3 by use of the wireless LAN or Bluetooth. Specifically, the communication unit 56 communicates by the wireless LAN with the imaging apparatus 3 which functions as an access point (AP) of the wireless LAN. The communication unit 56 can also communicate with the HMD 7 via the imaging apparatus 3 which functions as the AP. The communication unit 56 also permits a communication by Bluetooth by pairing with each of the imaging apparatuses 3.

The operation unit 57 comprises operational components for the user to perform various operations of the smartphone 5. The operation unit 57 generates operation signals on the basis of the operation of the operational components by the user, and supplies the generated operation signals to the control unit 58. The operational components comprise, for example, a sound volume adjustment key for adjusting sound volume, a luminance adjustment key for adjusting the display luminance of the display unit 54, and an electric power supply key for switching the electric power supply state of the smartphone 5. The operation unit 57 may also be configured to receive an operational signal from a keyboard, a mouse, or some other input device which can generate the operational signal.

The operation unit 57 further comprises the touch sensor 59. The touch sensor 59 is a capacitance type sensor, a thermosensor, or a device which generates positional information on the basis of some other method. For example, the touch sensor 59 is provided integrally with the display panel of the display unit 54. The touch sensor 59 generates an operational signal on the basis of an operation on a screen displayed on the display panel, and supplies the operational signal to the control unit 58.

The control unit 58 controls the operation of each unit of the smartphone 5. The control unit 58 comprises, for example, a CPU and a memory. The control unit 58 enables various functions when the CPU reads and executes programs, applications, and data for control stored in the memory or the storage unit 55. The control unit 58 can also generate a screen in accordance with the application executed by the CPU, and display the screen by the display unit 54. The control unit 58 can also generate an audio signal in accordance with the application executed by the CPU, and output the audio signal by the speaker 53.

The storage unit 55 stores, for example, an application (control application) to control the imaging apparatus 3 which can communicate with the smartphone 5. The control unit 58 executes the control application, and generates a control signal for controlling the operation of the imaging apparatus 3 on the basis of an operation by the operation unit 57 on the screen of the control application. For example, the control unit 58 generates a control signal which causes the imaging apparatus 3 to perform an action for changing the imaging setting. For example, the control unit 58 generates a control signal which causes the imaging apparatus 3 to perform an imaging action. The control unit 58 controls the operation of the imaging apparatus 3 by sending the generated control signal to the imaging apparatus 3.

The control unit 58 may be configured to send, to the imaging apparatus 3, information indicating that the smartphone 5 has been operated by the user. The control unit 58 may also be configured to regularly send information indicating its state to the imaging apparatus 3 to inform the imaging apparatus 3 that the smartphone 5 has been operated by the user.

The control unit 58 can display the subject image output from the imaging apparatus 3 on the screen of the control application. For example, the control unit 58 can perform imaging result display to display the subject image as a still image output from the imaging apparatus 3 on the screen of the control application. For example, the control unit 58 can also perform through-image display to display the subject images as through-images output from the imaging apparatus 3 on the screen of the control application.

The smartphone 5 also comprises an unshown electric power supply unit. The electric power supply unit comprises a battery, and a terminal (e.g. a DC jack) for connecting to an adapter which receives electric power from, for example, a commercial electric power source. The electric power supply unit charges the battery with the electric power received from the commercial electric power source. The electric power supply unit also supplies the electric power which has charged the battery to each unit inside the smartphone 5.

Figure 5:
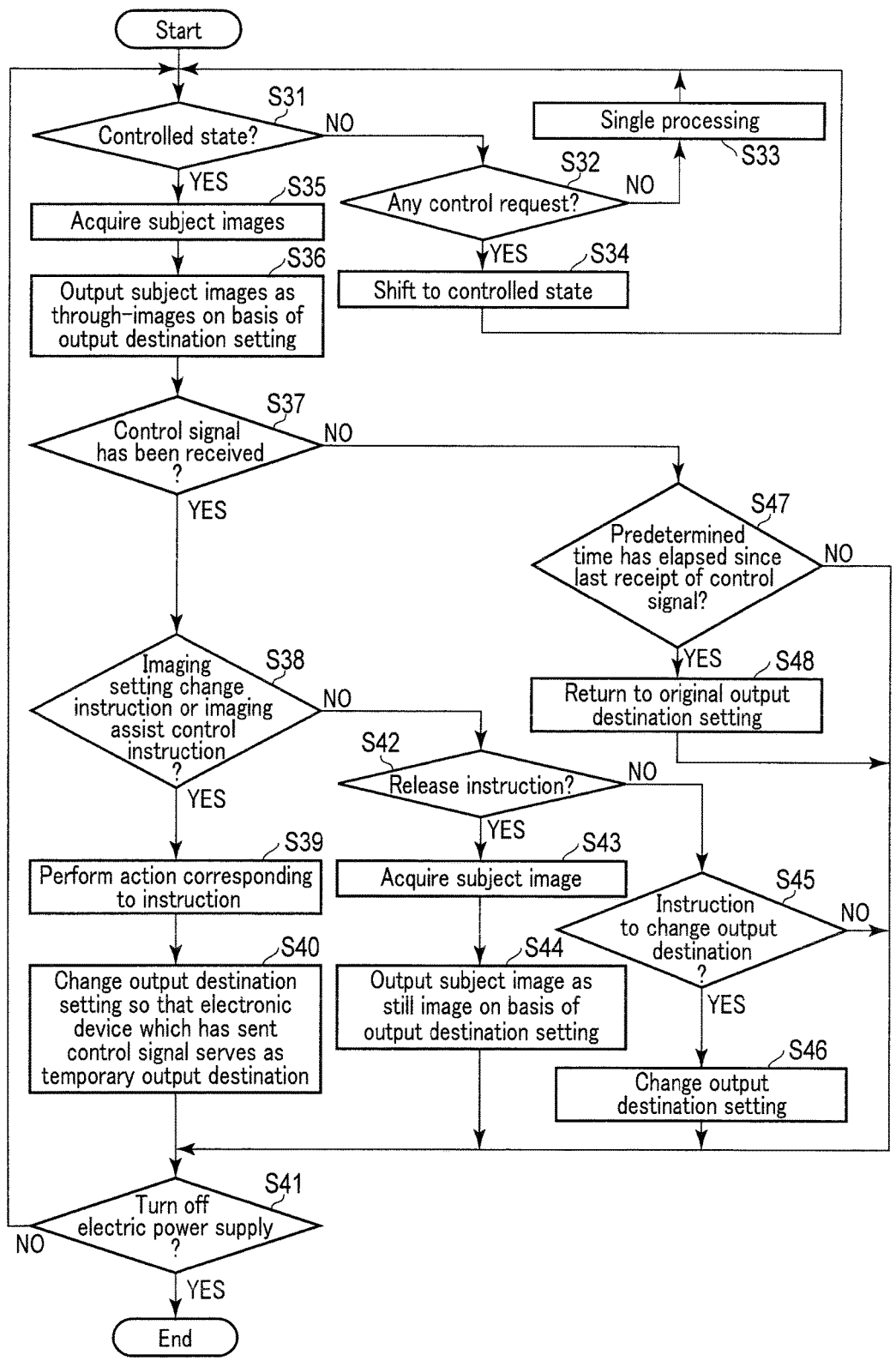
FIG. 5 is a diagram illustrating an example of the operation of the electronic device according to one embodiment.

FIG. 4 and FIG. 5 are flowcharts illustrating the actions of the smartphone 5 and the imaging apparatus 3. FIG. 4 is a flowchart illustrating the action of the smartphone 5. In the example of FIG. 4, the action of the smartphone 5 intended to control a given imaging apparatus 3 is described.

The control unit 58 of the smartphone 5 starts the control application in accordance with the operation by the user (step S11). For example, the control unit 58 starts the control application in accordance with an operation by the user to select the control application.

When the control unit 58 has started the control application, the control unit 58 specifies the imaging apparatus 3 to be targeted for control (step S12). For example, the control unit 58 recognizes the imaging apparatuses 3 existing in a range in which the communication unit 56 can communicate, so that the display unit 54 displays a list of the imaging apparatuses 3. The control unit 58 specifies the imaging apparatus 3 selected by the user as the control target from the list display. The control unit 58 may also be configured to specify a preset imaging apparatus 3 as the control target.

The control unit 58 sends a control request to the imaging apparatus 3 specified as the control target (step S13). The control request is information to request the control target imaging apparatus 3 that the action of the control target imaging apparatus 3 can be controlled by a control signal sent from the smartphone 5.

The control unit 58 judges whether the control request has been granted (step S14). When the control request has been granted in the imaging apparatus 3, information indicating that the control request has been granted is output from the imaging apparatus 3. When receiving the information indicating that the control request has been granted, the control unit 58 judges that the control request has been granted so that the action of the imaging apparatus 3 can be controlled by the control signal. When receiving the information indicating that the control request has not been granted, the control unit 58 judges that the control request has not been granted. Moreover, the control unit 58 may judge that the control request has not been granted when receiving no response to the control request from the control target imaging apparatus 3 after sending the control request.

When judging that the control request has not been granted (step S14, no), the control unit 58 outputs a caution (step S15). For example, the control unit 58 displays, on the display unit 54, a caution indicating that the control request has not been granted.

When judging that the control request has been granted (step S14, yes), the control unit 58 judges whether to switch the control target (step S16). For example, the control unit 58 judges to switch the control target when an operational input to switch the control target imaging apparatus 3 is performed on the operation unit 57.

When judging to switch the control target (step S16, yes), the control unit 58 shifts to the processing in step S12, and performs the processing in steps S12 to S14, thereby connecting to a control target.

When judging not to switch the control target (step S16, no), the control unit 58 judges whether the subject images as through-images have been received (step S17). When judging that the subject images as the through-images have been received (step S17, yes), the control unit 58 displays the through-images using the received subject images (step S18).

The control unit 58 judges whether an operation indicating an action regarding imaging such as the change of the imaging setting or the imaging assist control has been input (step S19). When judging that the operation indicating the change of the imaging setting or the imaging assist control has been input (step S19, yes), the control unit 58 generates a control signal corresponding to the operation, and sends the control signal to the imaging apparatus 3 (step S20). That is, when an operational input to change the imaging setting on the screen of the control application is performed on the operation unit 57, the control unit 58 generates a control signal to change the imaging setting in accordance with the contents of the operation, and sends the control signal to the control target imaging apparatus 3. When an operational input to perform the imaging assist control on the screen of the control application is performed on the operation unit 57, the control unit 58 generates a control signal which causes the control target imaging apparatus 3 to perform the imaging assist control in accordance with the contents of the operation, and sends the control signal to the control target imaging apparatus 3.

The control unit 58 judges whether an operation indicating the execution of an imaging action has been input (step S21). When judging that the operation indicating the execution of the imaging action has been input (step S21, yes), the control unit 58 generates a control signal indicating the execution of the imaging action, and sends the control signal to the imaging apparatus 3 (step S22). That is, when an operational input indicating the execution of the imaging action on the screen of the control application is performed on the operation unit 57, the control unit 58 generates a control signal indicating the imaging action (release), and sends the control signal to the control target imaging apparatus 3.

The control unit 58 judges whether the subject image as a still image has been received (step S23). When judging that the subject image as the still image has been received (step S23, yes), the control unit 58 performs imaging result display using the received subject images (step S24).

The control unit 58 judges whether an operation indicating the change of the output destination setting has been input (step S25). When judging that the operation indicating the change of the output destination setting has been input (step S25, yes), the control unit 58 generates a control signal instructing to change the output destination setting, and sends the control signal to the imaging apparatus 3 (step S26). The control signal instructing to change the output destination setting has information to specify the electronic device which serves as the output destination of the subject image. For example, the control unit 58 generates a control signal having the information to specify the electronic device which serves as the output destination of the subject image in accordance with the operation indicating the change of the output destination setting, and sends the control signal to the imaging apparatus 3.

The control unit 58 judges whether an operation to end the control application has been input (step S27). When judging that the operation to end the control application has been input (step S27, yes), the control unit 58 ends the control application to cancel the state of controlling the imaging apparatus 3. When judging that the operation to end the control application has not been input (step S27, no), the control unit 58 shifts to the processing in step S16, and repeats the processing in steps S16 to S26.

FIG. 5 is a flowchart illustrating the action of the imaging apparatus 3. In the example described in FIG. 5, the HMD 7 is set as the output destination setting in advance, and the action of the imaging apparatus 3 is controlled by an electronic device such as the smartphone 5.

When started, the main control unit 20 of the imaging apparatus 3 judges whether its state is controllable (controlled state) by an electronic device such as the smartphone 5 (step S31). When the main control unit 20 judges that its state is not the controlled state (step S31, no), the main control unit 20 judges whether a control request has been received (step S32). For example, the main control unit 20 judges whether the control request sent by the smartphone 5 in step S13 in FIG. 4 has been received.

When judging that the control request has not been received (step S32, no), the main control unit 20 performs single processing by the imaging apparatus 3 (step S33). For example, the imaging apparatus 3 performs an imaging action in accordance with the operation of the operation unit 15.

When judging in step S32 that the control request has been received (step S32, yes), the main control unit 20 judges whether to grant the control request received from the electronic device. When granting the control request, the main control unit 20 brings itself into the controlled state (step S34). That is, the main control unit 20 turns into a state to be able to perform various actions by the control signals sent from an electronic device such as the smartphone 5. In this case, the main control unit 20 may send, to the electronic device which has sent the control request, information indicating that the control request has been granted. When the main control unit 20 does not grant the control request received from the electronic device, the main control unit 20 does not bring its state into the controlled state, and may keep performing the single processing by the imaging apparatus 3. Moreover, when the main control unit 20 does not grant the control request received from the electronic device, the main control unit 20 may send, to the electronic device which has sent the control request, information indicating that the control request is not granted.

When the main control unit 20 judges in step S31 that its state is the controlled state (step S31, yes), the main control unit 20 acquires subject images by the imaging unit (step S35). The main control unit 20 specifies the electronic device on the basis of preset output destination setting, and outputs the subject images as through-images to the specified electronic device (step S36). As described above, the main control unit 20 holds, in the memory of the main control unit 20 or in the recording medium M attached to the memory I/F 17, the output destination setting to specify the output destination electronic device to which the subject images are output. For example, as described above, the main control unit 20 outputs the subject images as the through-images to the HMD 7 because the HMD 7 is set as the output destination. The HMD 7 can display the through-images by sequentially displaying the received subject images.

The main control unit 20 may be configured to search for an electronic device that can wirelessly communicate with, and output subject images to the found electronic device when no output destination electronic device is set in the output destination setting. The main control unit 20 may also be configured to judge whether the subject images can be output to the electronic device as the output destination in the output destination setting, and when impossible, search for an electronic device that can wirelessly communicate with, and output subject images to the found electronic device. Moreover, the main control unit 20 may also be configured to update the output destination setting so that the found electronic device serves as the output destination electronic device.

The main control unit 20 judges whether a control signal has been received (step S37). When judging that the control signal has been received (step S37, yes), the main control unit 20 analyzes the received control signal, and judges whether the received control signal is a control signal indicating an instruction to change the imaging setting or an instruction to execute the imaging assist control (step S38). That is, the main control unit 20 judges in step S20 in FIG. 4 whether a control signal sent by the smartphone 5 has been received.

When judging that the received control signal is the control signal indicating an instruction to change the imaging setting or an instruction to execute the imaging assist control (step S38, yes), the main control unit 20 performs an action corresponding to the control signal (step S39). That is, when judging that the received control signal is the control signal indicating an instruction to change the imaging setting, the main control unit 20 changes the imaging setting in accordance with the received control signal. When judging that the received control signal is the control signal indicating the execution of the imaging assist control, the main control unit 20 executes the imaging assist control in accordance with the received control signal.

The main control unit 20 changes the output destination setting so that the electronic device which has sent the control signal serves as a temporary output destination (step S40). That is, the main control unit 20 writes, into the output destination setting, the temporary output destination indicating the electronic device which has sent the control signal. For example, when the electronic device which has sent the control signal is the smartphone 5, the main control unit 20 writes the smartphone 5 into the output destination setting as the temporary output destination. Thus, the main control unit 20 temporarily switches the output destination of the subject images from the HMD 7 to the smartphone 5.

The main control unit 20 judges whether an operation to turn off the electric power supply of the imaging apparatus 3 has been input (step S41). When judging that the operation to turn off the electric power supply of the imaging apparatus 3 has been input, the main control unit 20 ends the action. When judging that the operation to turn off the electric power supply of the imaging apparatus 3 has not been input, the main control unit 20 shifts to step S31.

For example, when the main control unit 20 has switched the output destination from the HMD 7 to the smartphone 5 in step S40, the main control unit 20 outputs the subject images acquired in step S35 to the smartphone 5 in step S36. Thus, the main control unit 20 can cause the smartphone 5 on which an operation such as the change of the imaging setting or the imaging assist control has been performed to display the through-images.

When judging in step S38 that the received control signal is the control signal indicating an instruction to change the imaging setting or an instruction to execute the imaging assist control (step S38, no), the main control unit 20 judges whether the received control signal is a control signal indicating a release instruction (step S42). That is, the main control unit 20 judges whether the control signal sent by the smartphone 5 in step S22 in FIG. 4 has been received.

When judging that the received control signal is the control signal indicating the release instruction (step S42, yes), the main control unit 20 controls the imaging unit to perform an imaging action to acquire a subject image as a still image (step S43).

The main control unit 20 specifies the electronic device on the basis of the output destination setting, outputs the subject image as a still image to the specified electronic device (step S44), and shifts to step S41. For example, as described above, when the HMD 7 is set as the output destination, the main control unit 20 outputs the subject image as the still image to the HMD 7. The HMD 7 can perform imaging result display by displaying the received subject image. For example, when the output destination is switched from the HMD 7 to the smartphone 5, the main control unit 20 outputs the subject image as the still image to the smartphone 5. The smartphone 5 can perform imaging result display by displaying the received subject image.

When judging in step S42 that the received control signal is not the control signal indicating the release instruction (step S42, no), the main control unit 20 judges whether the received control signal is a control signal instructing to change the output destination setting (step S45). That is, the main control unit 20 judges whether the control signal sent by the smartphone 5 in step S26 in FIG. 4 has been received.

When judging that the received control signal is the control signal instructing to change the output destination setting (step S45, yes), the main control unit 20 changes the output destination setting on the basis of the control signal instructing to change the output destination setting (step S46), and shifts to step S41. That is, the main control unit 20 sets the electronic device specified by the control signal as the output destination.

When judging in step S45 that the received control signal is not the control signal instructing to change the output destination setting (step S45, no), the main control unit 20 performs processing corresponding to the received control signal, and shifts to step S41.

When judging in step S37 that the control signal has not been received (step S37, no), the main control unit 20 judges whether a preset given time has elapsed since the last receipt of the control signal (step S47). That is, the main control unit 20 judges whether a predetermined time has elapsed since the electronic device was no longer operated by the user. When judging that the preset given time has elapsed since the last receipt of the control signal (step S47, yes), the main control unit 20 returns the output destination setting to the original output destination setting from the temporary output destination (step S48), and shifts to step S41.

According to the processing described above, the imaging apparatus 3 outputs the subject images as through-images to the electronic device set in the output destination setting, and when a preset operation is performed in the electronic device, the imaging apparatus 3 can switch the output destination of the subject images as the through-images to the electronic device on which the above operation has been performed.

According to such a configuration, the imaging apparatus 3 causes the HMD 7 to output the through-images when a predetermined operation is not performed by the smartphone 5, and the imaging apparatus 3 can switch the output destination of the through-images from the HMD 7 to the smartphone 5 when the predetermined operation is performed by the smartphone 5. Thus, the user can check the through-images without the hands full of the HMD 7 when performing no operation, and the user can check the subject image on the smartphone 5 when performing the predetermined operation on the smartphone 5. That is, the user can use the through-images displayed on the HMD 7 to adjust, for example, the angle of view of the image taken by the imaging apparatus 3, and adjust exposure while checking the through-images on the smartphone 5. As a result, it is possible to provide an imaging apparatus, a control method of the imaging apparatus, an imaging system, and a portable display device having higher convenience.

Although the imaging apparatus 3 is configured to change the output destination to the electronic device operated by the user in the embodiment described above, the imaging apparatus 3 is not limited to this configuration. The imaging apparatus 3 may be configured to change the output destination to one of the electronic devices when recognizing that one of the electronic devices has been operated by the user. For example, in the case of a configuration in which a screen for operating the imaging apparatus 3 is displayed on the first electronic device and the subject image output from the imaging apparatus 3 is displayed on the second electronic device, the first electronic device requests the imaging apparatus 3 to change the output destination of the through-images to the second electronic device when the first electronic device is operated. When requested from the first electronic device to change the output destination of the through-images to the second electronic device, the imaging apparatus 3 changes the output destination to the second electronic device. Thus, the electronic device may be configured to request the imaging apparatus 3 to change the output destination of the subject image during operation to any other electronic device.

The imaging apparatus 3 may be configured to set the temporary output destination during operation to a device indicated from a portable display device such as the smartphone 5. That is, the imaging apparatus 3 may be configured to comprise a communication unit configured to wirelessly communicate with devices comprising an imaging unit which images a subject to acquire a subject image, a wearable display device, and a portable display device, an output unit configured to output the subject image to the wearable display device among the devices, a recognition unit which recognizes that the portable display device has been operated, and an output control unit which performs output control to change the output destination of the subject image by the output unit to the portable display device when the recognition unit recognizes that the portable display device has been operated, and return the output destination of the subject image by the output unit to the wearable display device when the operation of the portable display device has ended. According to such a configuration, the imaging apparatus 3 can provide both handsfreeness and quick operability.

The operation end here may be limited to a particular operation such as a photography-related operation or may be a switch input of the end operation, and the timing of becoming unable to judge an operation, the elapse of a predetermined time since then, a motion judgment, or voice recognition may be used. Since a smartphone or the like is also used to, for example, telephone or e-mail, it is important in this case to design so that the switch of the displays is not performed.

A portable display device such as the smartphone 5 may be configured to control the imaging apparatus 3 by communicating with the imaging apparatus 3 which images a subject to acquire a subject image and then sends the subject image to the wearable display device. That is, a portable display device such as the smartphone 5 may be configured to comprise a communication unit configured to wirelessly communicate with this imaging apparatus, a recognition unit which recognizes that the portable display device has been operated, and an output control unit which outputs, to the imaging apparatus, a signal to change, from the wearable display device to the portable display device, the output destination of the subject image from the imaging apparatus in accordance with the recognition result by the recognition unit. According to such a configuration, a portable display device such as the smartphone 5 can control the imaging apparatus 3 to temporarily switch the output destination of the subject image from the imaging apparatus 3 to the portable display device from a wearable display device such as the HMD 7 when an operation is input. For example, by outputting a signal instructing to change the output destination to the imaging apparatus 3 by a command communication of Bluetooth, the portable display device can control the imaging apparatus 3 without interrupting the sending and receiving of the subject image by the wireless LAN.

(Modification 1)

According to the configuration in the embodiment described above, the imaging apparatus 3 outputs subject images as through-images to the electronic device set in the output destination setting, and when a preset operation is performed in the electronic device, the imaging apparatus 3 switches the output destination of the subject images as the through-images to the electronic device on which the above operation has been performed. However, the imaging apparatus 3 is not limited to this configuration. The imaging apparatus may be configured to output subject images as through-images to the electronic devices, and when a preset operation is performed in one of the electronic devices, switch the output destination of the subject images as the through-images to the electronic device on which the above operation has been performed.

When configured to output subject images as through-images to the electronic devices, the main control unit 20 stores the output destination setting in which the electronic devices are set as output destinations. When configured in this way, the main control unit 20 of the imaging apparatus 3 specifies electronic devices on the basis of the output destination setting in step S36 shown in FIG. 5, and outputs subject images as through-images to the specified electronic devices. For example, the main control unit 20 sends the subject images as the through-images to the electronic devices based on the output destination setting by the one-way communication. Thus, the imaging apparatus 3 can simultaneously output the subject images as the through-images to the electronic devices. Further, when recognizing in step S38 shown in FIG. 5 that a predetermined operation is performed in one of the electronic devices that can communicate with, the main control unit 20 changes the output destination setting so that the electronic device on which the operation has been performed serves as a temporary output destination. In this case, the main control unit 20 switches communication methods to communicate with the electronic device set as the output destination by the two-way communication. This further ensures that the main control unit 20 can receive the control signal sent from the electronic device.

According to such a configuration, the imaging apparatus 3 switches the communication methods to send the subject image to the devices by the one-way communication when no electronic device is operated by the user and to communicate with an electronic device to which an operation has been input by the two-way communication when recognizing that the electronic device has been operated by the user, and the imaging apparatus 3 sends the subject image to the electronic device operated by the user by the two-way communication. Thus, the electronic devices can display the through-images when no electronic device is operated by the user, and the electronic device operated by the user can display the through-images when the electronic device is operated by the user. Moreover, the imaging apparatus 3 can more certainly send and receive the control signal and the subject image by communicating with the electronic device operated by the user by the two-way communication. As a result, it is possible to provide an imaging apparatus, a control method of the imaging apparatus, an imaging system, and a portable display device having higher convenience.

(Modification 2)

Although the main control unit 20 is configured to store the electronic device which outputs the subject image as an output destination setting in the embodiment described above, the main control unit 20 is not limited to this configuration. The main control unit 20 may be configured to set different output destinations for the subject images as the through-images and for the subject image as the still image, respectively.

Furthermore, the main control unit 20 may be configured to send the subject images as the through-images to one electronic device by the one-way communication, and send the subject image as the still image to multiple electronic devices by the two-way communication.

(Modification 3)

Although the imaging system 1 comprises one imaging apparatus 3 in the example described above in the embodiment, the imaging system 1 is not limited to the configuration described above. The imaging system 1 may be configured to comprise multiple imaging apparatuses. The imaging system 1 may also be configured to comprise multiple electronic devices to control the imaging apparatuses.

Figure 6:
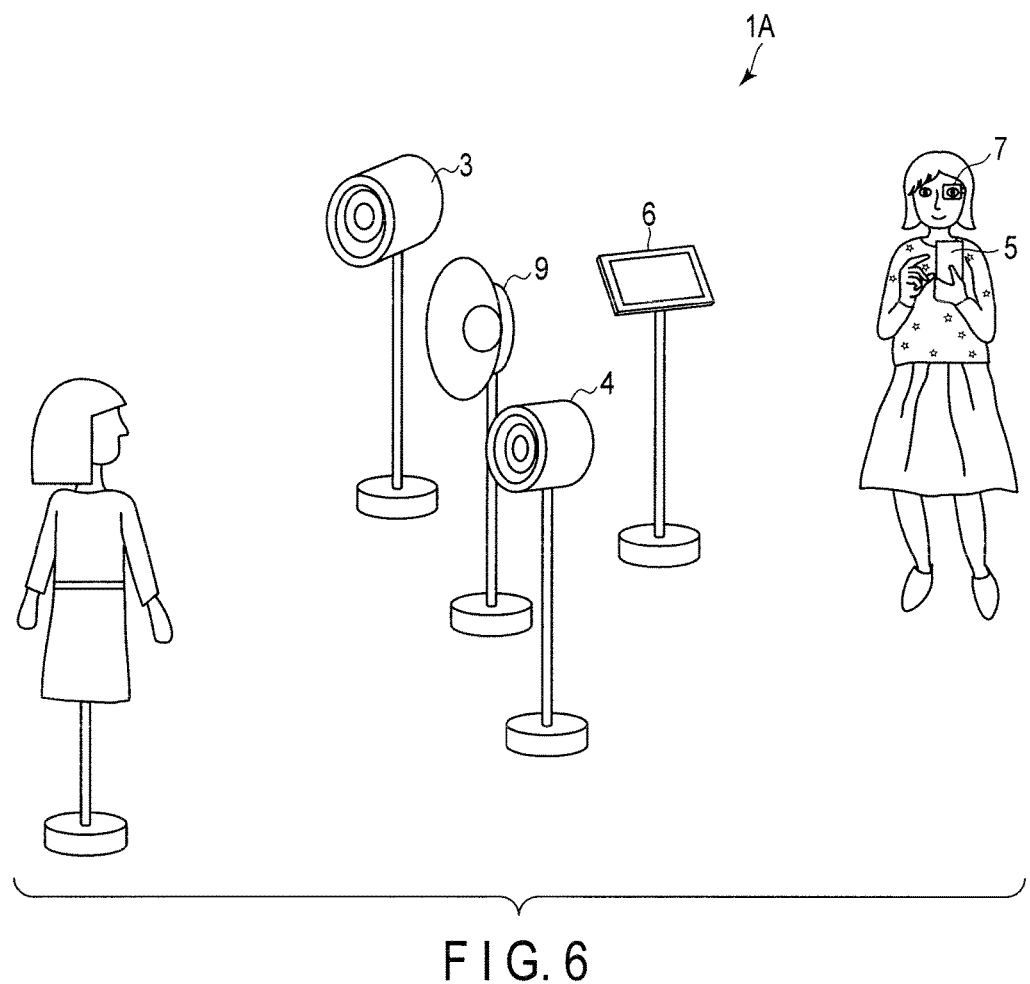
FIG. 6 is a diagram illustrating another example of an imaging system according to one embodiment.

FIG. 6 is an explanatory diagram illustrating an imaging system 1A which is another example of the imaging system 1. In the example of FIG. 6, the imaging system 1A comprises an imaging apparatus 3, an imaging apparatus 4, a smartphone 5, a tablet PC 6, an HMD 7, and a light emitting device 9.

The imaging apparatus 4 is similar in configuration to the imaging apparatus 3, and is therefore not described in detail.

The tablet PC 6 is substantially similar in configuration to the smartphone 5, but is different from the smartphone 5 in that the size of the display panel is larger.

The smartphone 5 and the tablet PC 6 control a particular imaging apparatus by executing a control application. The imaging apparatus 3 and the imaging apparatus 4 function as APs, and thereby outputs SSIDs. The smartphone 5 and the tablet PC 6 identify the imaging apparatus to be a control target by the SSIDs output by the imaging apparatus 3 and the imaging apparatus 4. Thus, the smartphone 5 and the tablet PC 6 can send control requests to the imaging apparatus to be a control target. As a result, the smartphone 5 and the tablet PC 6 can control any imaging apparatus as a control target.

The smartphone 5 and the tablet PC 6 can switch the imaging apparatus to be the control target in response to the operation on the screen of the control application. For example, the smartphone 5 and the tablet PC 6 may display a list of imaging apparatuses that can be control targets on the screen of the control application for the user to make a selection. The smartphone 5 and the tablet PC 6 may also be configured to display a switch button on the screen of the control application, and switch the imaging apparatuses to be control targets in order among the imaging apparatuses that can be control targets.

Although the imaging apparatus 3 is configured to comprise the lens 10 in the embodiment described above, the imaging apparatus 3 is not limited to this configuration. The imaging apparatus 3 may be configured to comprise a mount on which the lens 10 can be mounted instead of the lens 10. Imaging may be an observational display such as the through-images, or may be intended for inspections, diagnoses, or medical examinations. Imaging may be intended for still image photography as in a camera or may be intended for moving image photography, and may include sound in the case of moving images. Therefore, the imaging apparatus 3 is not limited to images, and may be read as an information acquiring unit. For example, the present invention is also advantageous to the setting of the direction of a microphone during recording.

Although the imaging apparatus 3 in the embodiment described above outputs the subject image to an electronic device set as an output destination among electronic devices that can communicate with the imaging apparatus 3. This output destination is composed by at least one of the output lines or at least one of the output devices. Moreover, the output destination may read it as the output route or the output telecommunication.

Although the imaging apparatus 3 is configured to comprise no display unit in the embodiment described above, the imaging apparatus 3 is not limited to this configuration. The imaging apparatus 3 may be configured to comprise a display unit. When the imaging apparatus 3 comprises a display unit, the imaging apparatus 3 can output a subject image to an electronic device while displaying the subject image on the display unit.

The functions described in each of the embodiments described above are not exclusively configured by use of hardware, and can also be obtained by reading, into a computer, programs in which the respective functions are written by use of software. Either software or hardware may be suitably selected to configure each of the functions.

The present invention is not completely limited to the embodiments described above, and modifications of components can be made at the stage of carrying out the invention without departing from the spirit thereof. Further, various inventions can be made by properly combining the components disclosed in the embodiments described above. For example, it goes without saying that the imaging unit and the wearable display unit may be a combined device or that the imaging unit and a portable terminal unit (portable display unit) may be configured to be one unit. For example, some of all the components shown in the embodiments may be eliminated. For example, it is possible to make such a modification as to eliminate a touch operation and use a sound operation. Moreover, the components in different embodiments may be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising: an imaging unit which images a subject to acquire a subject image;
   a communication unit configured to wirelessly communicate with devices;
   an output unit configured to output the subject image to the device previously set as an output destination among the devices;
   a recognition unit which recognizes that one of the devices has been operated by a user; and
   an output control unit which sets the output destination of the subject image by the output unit to the devices when no device is operated by the user, and changes the output destination of the subject image by the output unit from the devices to the device operated by the user when the recognition unit recognizes that the device has been operated by the user.

2. The imaging apparatus according to claim 1, wherein when the recognition unit recognizes that one of the devices has been operated by the user, the output control unit changes the output destination of the subject image by the output unit from a preset device to one of the devices operated by the user.

3. The imaging apparatus according to claim 1, wherein when a preset time has elapsed since the end of the operation of the device by the user, the output control unit returns the output destination of the subject image by the output unit to a preset device from the device operated by the user.

4. The imaging apparatus according to claim 1, wherein when a preset time has elapsed since the end of the operation of the device by the user, the output control unit returns the output destination of the subject image by the output unit to a preset device from the device operated by the user.

5. The imaging apparatus according to claim 2, wherein the output control unit sets the output destination of the subject image by the output unit to the devices when no device is operated by the user, and the output control unit changes the output destination of the subject image by the output unit from the devices to the device operated by the user when the recognition unit recognizes that the device has been operated by the user.

6. The imaging apparatus according to claim 1, wherein the output control unit controls the output unit to output the subject image to the devices by a one-way communication, and output the subject image to the device operated by the user by a two-way communication.

7. The imaging apparatus according to claim 5, wherein the output control unit controls the output unit to output the subject image to the devices by a one-way communication, and output the subject image to the device operated by the user by a two-way communication.

8. The imaging apparatus according to claim 2, wherein the output control unit judges whether the subject image is displayable on a preset device, and changes the output destination of the subject image to another one of the devices when judging that the subject image is not displayable on the preset device.

9. An imaging apparatus comprising: an imaging unit which images a subject to acquire a subject image;
   a communication unit configured to wirelessly communicate with devices;
   an output unit configured to output the subject image to the device previously set as an output destination among the devices;
   a recognition unit which recognizes that one of the devices has been operated by a user; and
   an output control unit which changes the output destination of the subject image by the output unit when the recognition unit recognizes that one of the devices has been operated by the user, wherein the output control unit judges whether the subject image is displayable on a preset device, and changes the output destination of the subject image to another one of the devices when judging that the subject image is not displayable on the preset device.

10. A control method of an imaging apparatus, the imaging apparatus comprising a communication unit configured to wirelessly communicate with devices, and an output unit configured to output a subject image to the device previously set as an output destination among the devices, the control method comprising:
    imaging a subject to acquire a subject image;
    recognizing that one of the devices has been operated by a user;
    setting the output destination of the subject image by the output unit to the devices when no device is operated by the user; and
    changing the output destination of the subject image by the output unit from the devices to the device operated by the user when recognizing that one of the devices has been operated by the user.

11. An imaging apparatus comprising:
    an imaging unit which images a subject to acquire a subject image;
    a communication unit configured to wirelessly communicate with devices comprising a wearable display device and a portable display device;
    an output unit configured to output the subject image to the wearable display device among the devices;
    a recognition unit which recognizes that the portable display device has been operated; and
    an output control unit which changes the output destination of the subject image by the output unit to the portable display device in accordance with the recognition result by the recognition unit, and returns the output destination of the subject image by the output unit to the wearable display device when the operation of the portable display device has ended,
    wherein the output control unit sets the output destination of the subject image by the output unit to the devices when no device is operated by the user, and the output control unit changes the output destination of the subject image by the output unit from the wearable display device to the portable display device operated by the user when the recognition unit recognizes that the portable display device has been operated by the user.

12. A control method of an imaging apparatus, the imaging apparatus comprising a communication unit configured to wirelessly communicate with devices, and an output unit configured to output a subject image to the device previously set as an output destination among the devices, the control method comprising:
- imaging a subject to acquire a subject image;
- recognizing that one of the devices has been operated by a user;
- judging whether the subject image is displayable on a preset device; and
- changing the output destination of the subject image to another one of the devices when judging that the subject image is not displayable on the preset device.

* * * * *